March 18, 1947.　　　　A. P. KRAMER　　　　2,417,556
TRIMMING APPARATUS
Filed April 21, 1945
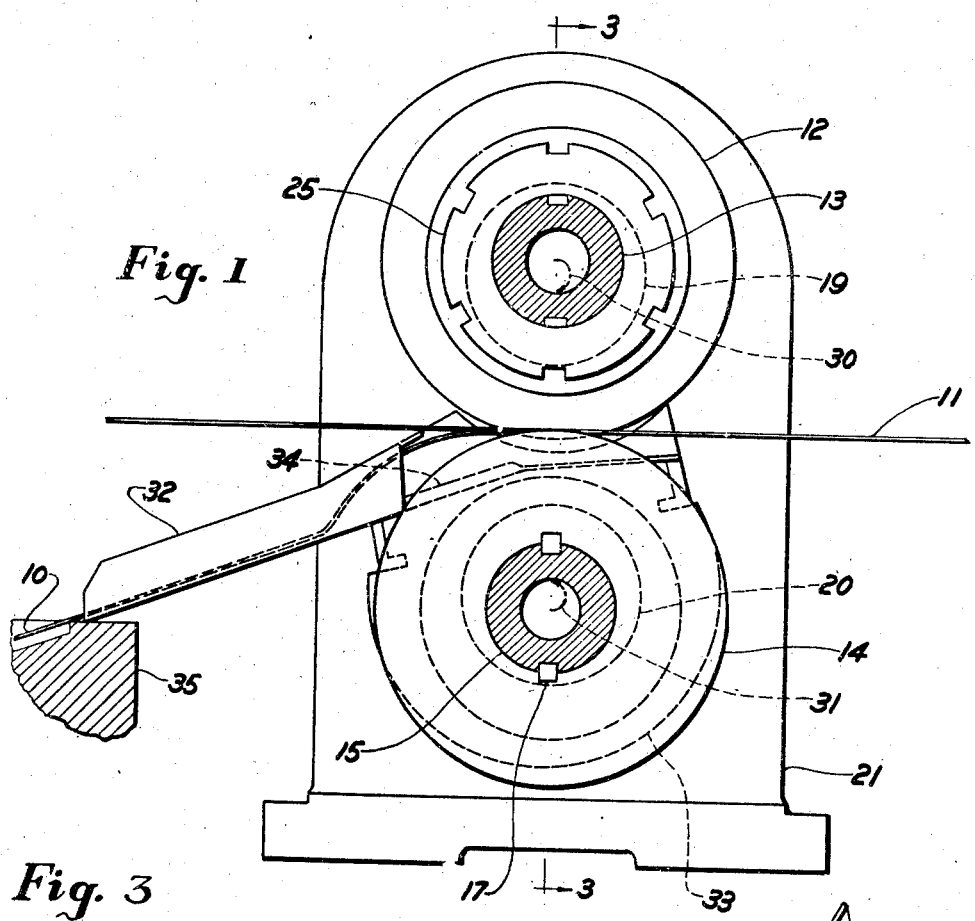
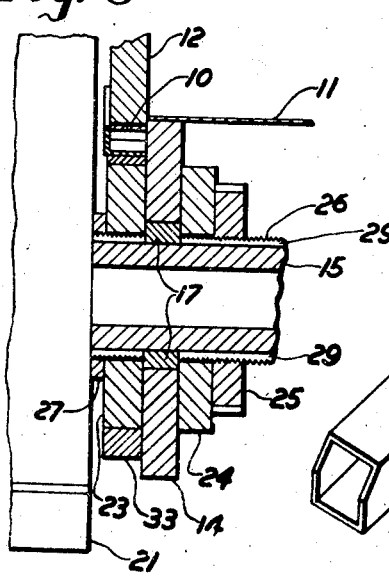
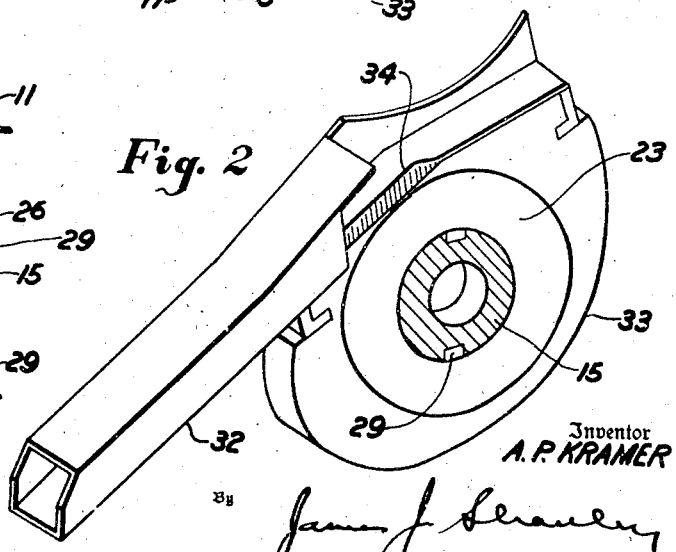
Inventor
A. P. KRAMER
By
Attorney Patented Mar. 18, 1947

2,417,556

UNITED STATES PATENT OFFICE 2,417,556

TRIMMING APPARATUS

Adrian P. Kramer, Detroit, Mich., assignor to National Steel Corporation, a corporation of Delaware Application April 21, 1945, Serial No. 589,571

5 Claims. (Cl. 164—10.6)

1

This invention relates to an improved apparatus for continuously trimming scrap from the side of strip, plates, sheets, and the like, and to a novel chute for deflecting and guiding the side scrap as it is trimmed from such a body.

In the production of finished steel strip, plates and sheets, hereinafter referred to collectively as sheets, it is usually necessary to remove scrap from along the side edges of the sheets by passing the sheets between rotating trimmer knives. This trimming operation produces sheets of the desired size by removing the usually imperfect edge metal. Disposal of the side scrap constitutes a serious and difficult problem for there is a tendency for the scrap to curl upwardly or downwardly and wrap itself around the apparatus. As the edges of the scrap are often sharp and serrated, it is definitely hazardous for an operator to manually grasp the scrap and guide it along the desired path as has been attempted. A common practice is to provide a guide rigidly mounted on the main frame for deflecting the scrap away from the path of movement of the trimmed sheet. It has been found in practice to be very difficult, if not impossible, to mount such a guide so that it will remain in proper alignment to receive the side scrap as it is removed from the sheet. Normally, it is necessary to repeatedly adjust the level and tilt of such a guide as the knives wear and are moved to compensate for such wear, for during adjustment, the knives are moved both horizontally and vertically which moves the knives out of proper alignment with the guide.

While this invention is primarily concerned with the trimming of steel strip, plates, sheets and the like, it is not limited to steel and may be used for trimming sheets of other metals or for trimming sheets of non-metallic materials.

It is an object of this invention to provide a trimming apparatus including side scrap guiding means which is so supported as to be correctly positioned at all times to receive the scrap as it is trimmed from the sheet.

Another object of this invention is to provide a scrap deflecting and guide chute so supported that when the trimmer knives are adjusted to compensate for wear, the chute will automatically assume the proper position.

The present invention provies an apparatus for trimming side scrap from a metal sheet and includes a knife and a rotatable, knife-supporting element. The apparatus also includes a chute supported on the rotatable, knife-supporting element so that regardless of the position to which

2 the knife is adjusted, the scrap guide chute is always correctly positioned relative to the knife to receive the scrap. The present invention eliminates the repeated adjustments heretofore necessary with the usual scrap guiding means mounted on a rigid support separate from the trimmer knife.

These and other objects and advantages will become more apparent from the following detailed description taken in connection with the accompanying drawings, in which:

Figure 1 is a sectional view of a trimming apparatus including a side scrap, guide chute and embodying the principles of the present invention;

Figure 2 is an isometric view of a side scrap, guiding chute of Figure 1; and,

Figure 3 is a fragmentary sectional view taken along line 3—3 of Figure 1.

Referring to the drawings, the trimming apparatus comprises means for severing side scrap 10 from along the edge of a steel sheet 11 and includes an upper trimmer knife 12 mounted on an upper arbor 13 and a lower trimmer knife 14 mounted on a lower arbor 15. The knives 12 and 14 are connected to the respective arbors 13 and 15 by keys 17 and the arbors 13 and 15 are rotatably supported in the eccentric sleeves 19 and 20 carried in the frame 21. The opposite, other ends of the arbors 13 and 15 are not shown but are similarly supported.

Referring more particularly to Figure 3, both of the trimmer knives 12 and 14 are similarly mounted on the respective arbors 13 and 15 and only knife 14 and the means for mounting it will be described in detail. On opposite sides of knife 14 there are spacer rings 23 and 24 as shown. A nut 25 engages the threads 26 on arbor 15 and the nut 25 may be tightened to hold the rings 23 and 24 and the knife 14 in position against the small thrust bearing ring 27 adjacent the frame 21. The nut 25 can be turned back and the rings 23 and 24 and knife 14 moved toward the right to position the knife 14 for trimming narrower sheets. When the knife 14 is moved toward the right away from frame 20, the keys 17 slide in the keyways 29 and it is necessary to provide a second nut, similar to nut 25, on the opposite side of ring 23 and these nuts can be turned toward each other to hold the parts in position on the arbor. As shown, the knives 14 and 13 are offset or staggered so that even though the periphery of each knife is a flat surface, the knives will sever side scrap from the sheet.

The knives 13 and 14 are worn down relatively rapidly during use and it is necessary to provide means for adjusting the knives to compensate for such wear. The arbors 13 and 15 are mounted in eccentric sleeves 19 and 20 as shown in Figure 1. When the eccentric sleeves are turned, the knives are adjusted toward each other. Normally the sleeves 19 and 20 will be turned in opposite directions to move the arbors toward each other. If sleeve 19 is turned clockwise, then the center of arbor 13 will move through the path indicated by the broken line 30 and the sleeve 20 being turned counterclockwise, the center of the arbor 15 will be moved through the path indicated by the broken line 31. Thus, when the eccentric sleeves 19 and 20 are turned to adjust the knives 12 and 14 toward each other to compensate for wearing down of the knives, the arbors and knives are moved both vertically and horizontally relative to the frame 21.

The chute 32 is mounted on a ring 33 which is rotatably supported by the ring 23 so that the chute 32 is carried by the arbor 15 and is rotatable with respect to the arbor. Chute 32 is supported in position to deflect and guide the side scrap as it is trimmed from the sheet passing between the rotating knives 12 and 14 and preferably includes a built up, relatively sharp, reinforced edge portion 34 of wear-resistant metal which increases the life of the chute. A common practice is to guide the scrap to a chopper (not shown) for cutting the scrap into small pieces but the scrap can be guided by the chute to any other desired location or apparatus. The stop element 35, which may be part of the scrap chopper, slidably supports the outer end of chute 32 and normally prevents it from turning about the longitudinal axis of arbor 15. With the chute mounted on the rotating knife-supporting arbor 15, the chute is always correctly positioned, even when the knife 14 is moved both vertically and horizontally to compensate for wear and even when the knife is moved along the arbor 15 to cut sheets of various widths. This eliminates the repeated adjustment of the chute as has been necessary heretofore when such scrap guiding means has been mounted on the rigid frame of the trimming apparatus.

The trimmer knives and scrap guiding chute can be and usually are duplicated at the opposite ends of the arbors for trimming the opposite edge of the sheet.

Having described my invention in detail, it is to be understood that some features may be used without others, all without departing from the spirit or scope of my invention except as set forth in the accompanying claims which define the scope of my invention.

I claim:

1. Apparatus for trimming side scrap from a metal sheet such as steel strip, steel plate and the like, said apparatus comprising, in combination, a rotatable trimmer knife for trimming side scrap from such a sheet; a rotatable knife-supporting member on which said trimmer knife is supported for rotation; a stop; and an elongated, side scrap guiding member mounted on said rotatable, knife-supporting member with an inner end adjacent the knife in position to receive the trimmed side scrap and with the other end slidably supported on said stop, said stop normally preventing rotational movement of said side scrap guiding member about said rotatable knife-supporting member.

2. Apparatus for trimming side scrap from a metal sheet such as steel strip, steel plate and the like, said apparatus comprising, in combination, co-acting upper and lower, rotatable trimmer knives for trimming side scrap from such a metal sheet; a rotatable arbor supporting the lower knife for rotation in a vertical plane; adjustable means supporting said arbor for vertical and horizontal adjusting movement to properly position said lower knife relative to the upper knife; a ring rotatably mounted on said arbor; an independent, normally fixed stop; and an elongated, side scrap guiding chute mounted on said ring with an inner end adjacent said trimmer knives in position to receive and guide the trimmed side scrap and with an outer end slidably supported by said stop which normally prevents rotation of said chute about said arbor.

3. Apparatus for trimming side scrap from a sheet such as steel strip, steel plate and the like, said apparatus comprising, in combination, means for trimming side scrap from such a sheet and including a trimmer knife and a rotatable, knife-supporting member; an eccentric, rotatable sleeve supporting said knife-supporting member for accurate movement whereby the level of the trimmer knife can be adjusted; side scrap guiding means mounted on said knife-supporting member in position to receive and guide the trimmed scrap; and supporting means normally preventing movement of said guiding means about said knife-supporting member.

4. Apparatus for trimming side scrap from a sheet comprising side scrap trimming means including a rotatable upper arbor, a rotatable lower arbor, a knife on said upper arbor, a knife on said lower arbor, said knives being so arranged as to trim side scrap from a sheet passed therebetween, and adjustable means for moving each of said arbors in an arc to separate said arbors and to move said arbors toward each other for maintaining the knives in operative relation with each other; side scrap guiding means mounted on said lower arbor in position to receive and guide the side scrap as it is severed by the knives; and supporting means normally preventing movement of said side scrap guiding means about said lower arbor.

5. Apparatus for trimming side scrap from a sheet comprising side scrap trimming means including a rotatable upper arbor, a rotatable lower arbor, a knife on said upper arbor, a knife on said lower arbor, said knives being so arranged as to trim side scrap from a sheet passed therebetween, and adjustable means for moving each of said arbors in an arc to separate said arbors and to move said arbors toward each other for maintaining the knives in operative relation with each other; and side scrap guiding means including a scrap guiding chute and a ring rotatably mounted on said lower arbor and supporting said chute in position to receive and guide the side scrap as it is severed by the knives.

ADRIAN P. KRAMER.

REFERENCES CITED

The following references are of record in the file of this patent:

UNITED STATES PATENTS

| Number | Name | Date |
| --- | --- | --- |
| 1,306,642 | Stevens | June 10, 1919 |
| 1,797,950 | Forman | Mar. 24, 1931 |
| 1,800,443 | Dustan | Apr. 14, 1931 |